Figure 1:
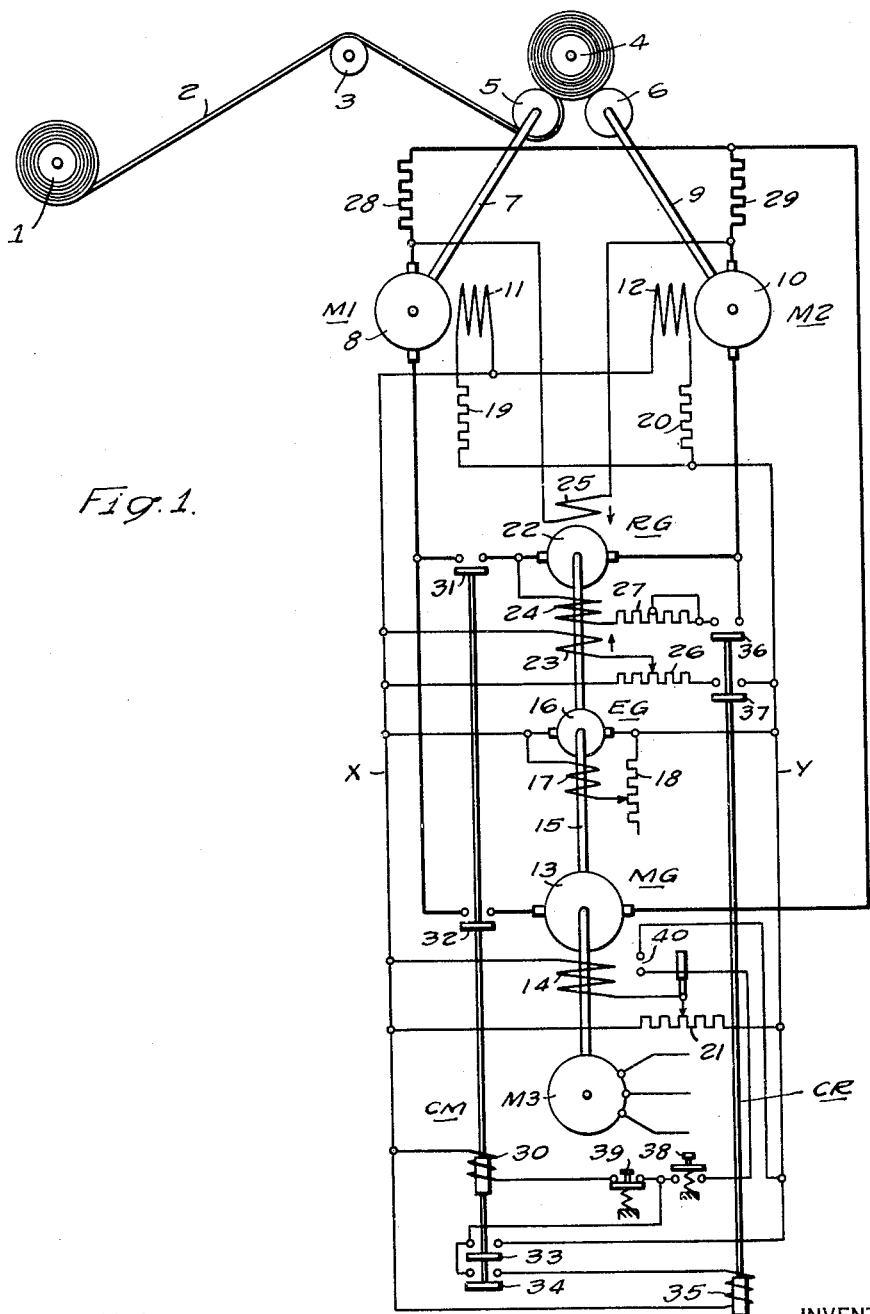

Feb. 21, 1950 R. R. BAKER ET AL 2,498,234
DRIVE SYSTEM
Filed Jan. 18, 1946 2 Sheets-Sheet 1

WITNESSES:
E. A. M'Closkey.

INVENTORS
Rest R. Baker and
Walter R. Harris.
BY
Paul E. Friedemann
ATTORNEY

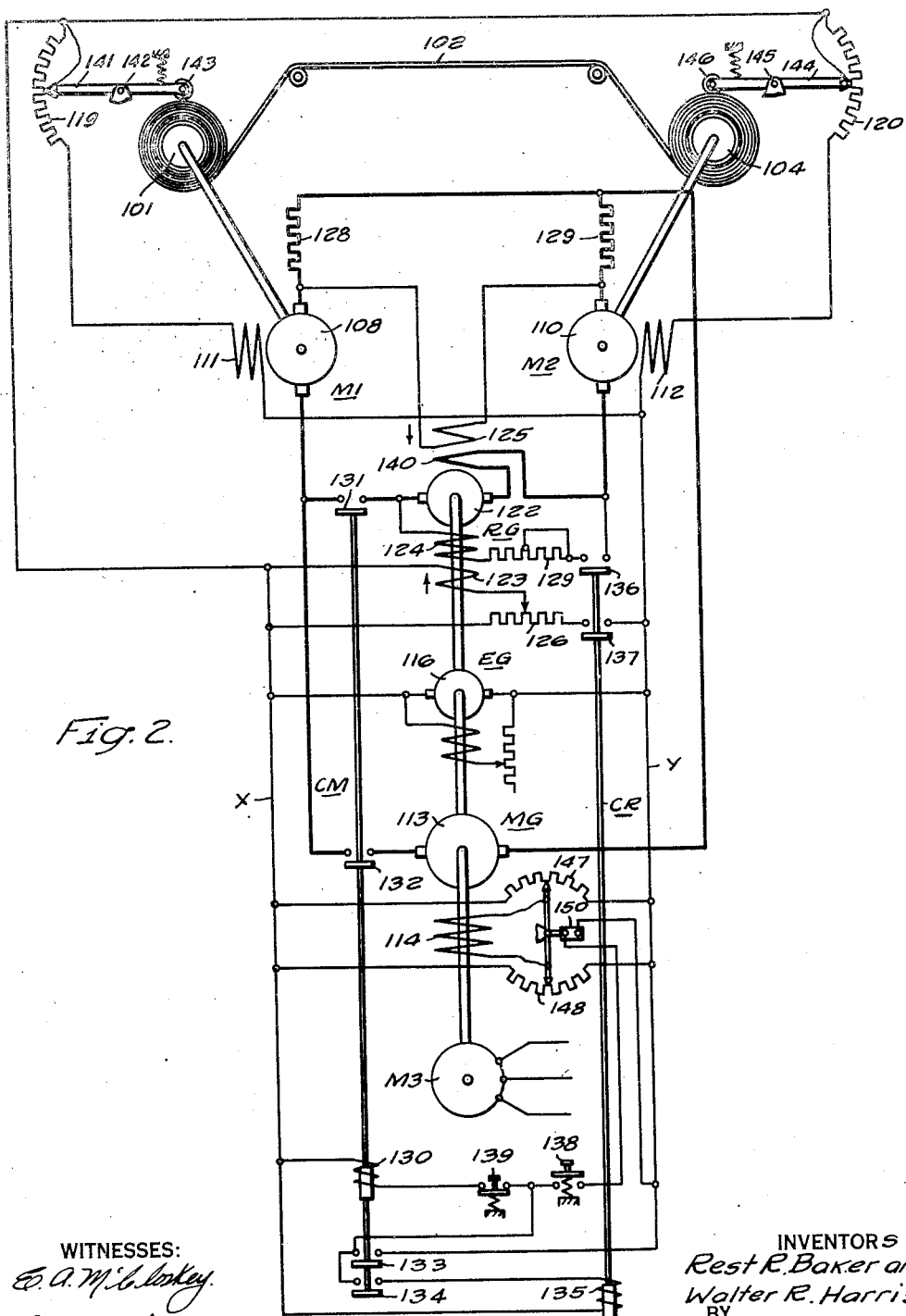

Patented Feb. 21, 1950

2,498,234

UNITED STATES PATENT OFFICE 2,498,234

DRIVE SYSTEM

Rest R. Baker, Pittsburgh, and Walter R. Harris, Wilkinsburg, Pa., assignors to Westinghouse Electric Corporation, East Pittsburgh, Pa., a corporation of Pennsylvania Application January 18, 1946, Serial No. 642,036

8 Claims. (Cl. 242—75)

Our invention relates to electric systems for controlling two variable speed motors to operate simultaneously at correlated speeds and under maintenance of a desired torque difference, and particularly to two-motor winder drives for sheet, strand and the like material.

It is among the objects of the invention to devise an electric control system which permits operating the motors of such drives at variable speed while maintaining automatically the desired torque difference and a corresponding load division between them without necessity of interconnecting the winder drums by mechanical gears and hence under avoidance of the wear and the service requirements usually incident to such mechanical devices.

The significance of these objects will be understood, for instance, from the following reference to the conditions obtaining with the two-drum peripheral-type winder drive heretofore used in paper industry. One of the two drums, acting peripherally on the roll of paper to be wound, must develop a higher torque than the other in order to obtain a properly wound roll. To this end, the two peripherally acting drums or their respective drives are usually interconnected by a gear or belt transmission of such a design as to impart a slightly higher speed to one of the drums. These transmissions are subjected to relatively high stress and wear so that the maintenance and servicing requirements are appreciable.

The ordinary two-motor electric drive as applied to these winders has two compound-wound direct-current motors supplied with power from a common generator and provided with rheostats to adjust the motor shunt fields for the proper division of load. This system secures the proper division of load at any one operating speed and voltage; however, due to differences in field heating which may occur, and more seriously due to the difference in the resistance drops when one motor is carrying more current than another, the drive will not maintain its current adjustment constant over the entire operating speed range. To wind a very tight roll one of the motors is occasionally required to act as a generator, in which case the resistance drop in its armature is reversed. Under such conditions, the maintenance of a proper division of load is a rather difficult problem.

The operating conditions and requirements of two-motor winder drives of the core type, one motor serving to unreel a storage roll and the other to drive a take-up roll, are in substance similar to those of the peripheral type winders referred to in the foregoing.

In order to avoid these shortcomings of the known type winder drives and the like multiple motor control systems, and in accordance with a feature of our invention, we connect two direct-current motors to a generator whose voltage is controllable to operate both motors at the desired correlated speeds; and we arrange in circuit with one of the motors a regulating generator in order to impress on that one motor an additive or subtractive control voltage or current which varies in dependance upon the load or current difference of the two motors and in the direction and extent required to maintain this difference at a given value.

These and other objects and features of the invention will be apparent from the two embodiments described below in conjunction with the appertaining drawings, in which:

Figure 1 illustrates the circuit diagram of a two-drum peripheral-type winder drive according to the invention, while Fig. 2 represents the circuit diagram of a two-motor core-type winder drive also in accordance with the invention.

Referring to Fig. 1, numeral 1 denotes the core of a supply reel of material, for instance, paper. The sheet 2 taken from the reel passes over a guide roller 3 onto a take-up reel on a core 4. The take-up reel is driven by means of two drums 5 and 6 which engage the reel peripherally and are to be driven simultaneously in order to impart winding motion to the reel.

Drum 5 is connected by suitable transmission, here schematically represented by a shaft 7, with the armature 8 of a direct-current motor M1. Drum 6 is connected by another transmission, also represented by a shaft 9, with the armature 10 of another direct-current motor denoted by M2. Motors M1 and M2 have separately excited field windings 11 and 12, respectively.

The load circuits of armatures 8 and 10 are connected in parallel to the armature 13 of a main generator MG whose field winding 14 is also separately excited. The shaft 15 of armature 13 carries also the armature 16 of an exciter generator EG, which is shown as having a shunt field winding 17 to provide self-excitation under control by a rheostat 18. Shaft 15 is driven by a constant speed motor M3. When the generator set operates at normal speed, the voltage generated by the exciter generator EG maintains a voltage of constant magnitude corresponding to the selected setting of rheostat 18, and this voltage is impressed on the mains X and Y of the control circuit. Field winding 11 of motor M1 is connected across mains X and Y through a resistor 19; and field winding 12 of motor M2 is similarly connected across these mains through a resistor 20. Field winding 14 of main generator MG is likewise excited from mains X and Y through a potentiometric rheostat 21. The setting of rheostat 21 determines the voltage generated by the main generator 13 and hence the operating speeds of the two motors M1 and M2.

The armature 22 of a regulating generator RG is also mounted on shaft 15 and electrically connected in series with the armature 10 of motor M2 so as to lie in the parallel branch of armature 10 relative to the parallel branch of the load circuit containing the armature 8 of motor M1. Hence the direct-current voltage generated by the regulating generator acts either in addition to or subtraction from the voltage impressed on the armature 10 of motor M2 by the main generator. That is, the voltage generated by armature 12 boosts or bucks the main generator voltage relative to motor M2, depending upon operating conditions of the system to be discussed in a later place.

The regulating generator RG has three field windings 23, 24 and 25. Winding 23, hereinafter called the "pattern field winding," receives constant excitation from mains X and Y through a rheostat 26. The magnitude of this excitation depends on the selected setting of rheostat 26 and can be varied in accordance with the desired difference in the torques developed by the two motors M1 and M2 or the respective drums 5 and 6. Winding 24 is connected across the armature 22 of generator RG through a calibrating rheostat 27 and hence provides the regulating generator with self-excitation. The resistance of the circuit of winding 24 is adjusted by means of rheostat 27 so that the resistance line of this field winding is approximately coincident with the no-load saturation characteristic of the machine. As a result, the winding 24 tends to maintain the output voltage of the regulating generator at any value, along the unsaturated portion of the machine characteristic.

The field winding 25, hereinafter called the "pilot field winding," acts magnetically in opposition to the pattern field winding 23. The windings 23 and 25 are so rated that their differential effect is balanced out under the desired operating conditions of the system. Hence, during steady state operating periods, the differential windings 23 and 25 have no control effect on the generator while the output voltage of this generator is then sustained by the effect of the self-excited winding 24.

The pilot field winding 25 has its two terminals connected to two resistors denoted by 28 and 29, respectively. Resistor 28 is connected in series with armature 8 in the appertaining parallel branch of the load circuit; and resistor 29 is similarly connected in the load circuit branch of armature 10. The two resistors have equal resistance values. When both motors operate under the same current load, the voltage drop across resistor 28 equals that appearing across resistor 29 so that the potential difference between the terminals of the pilot field winding 25 is zero. When the motors M1 and M2 operate under different current loads, a difference in potential appears across the terminals of the pilot field winding so that this winding receives excitation in a direction and in an amount depending upon the load difference of the two motors. When this excitation of pilot field winding 25 is in accordance with the oppositely acting excitation of the pattern field winding 23 as adjusted by the chosen setting of rheostat 26, the pilot and pattern fields cancel each other as mentioned in the foregoing. Otherwise, the resultant differential field of the two windings will have a finite value and direction and hence cause the armature 22 to change its output voltage in the direction and by the amount necessary to restore the differential load of motors M1 and M2 to the value at which the pilot field and pattern field are balanced. Under this condition the self-energized field acts to maintain the output voltage of armature 22.

The control system includes a contractor CM and a control relay CR, both of the electromagnetic type. The coil 30 of contactor CM controls two main contacts 31 and 32 as well as two auxiliary contacts 33 and 34. The coil 35 of relay CR serves to actuate two contacts 36 and 37 and receives excitation from mains X and Y through the auxiliary contacts 33 and 34 of contactor CM. The coil circuit of contactor CM extends between mains X and Y and is controlled by a normally open start contact 38, a normally closed stop contact 39, and an interlock contact 40 on rheostat 21. The contact 40 is closed only when the rheostat 21 is in low voltage position.

Assuming the motor generator set to be driven by motor M3 at constant speed so that the generators MG and RG are in operative condition while the mains X and Y are energized by the exciter generator EG, and with rheostat 21 set for minimum field excitation of generator G, the winder motors M1 and M2 can be started by closing the start contact 38. This completes the circuit of contactor coil 30 so that the armature circuits of generators MG and RG are closed by the respective contacts 32 and 31. Immediately thereafter, the contact 33 of contactor CM short circuits the start contact 38 and thereby closes a self-holding circuit for coil 30, while the contact 34 places excitation on coil 35 of relay CR which then applies field excitation to coils 23 and 24 of the regulating generator RG by closing the relay contacts 37 and 36 respectively. The closure of contactor CM causes the motors M1 and M2 to operate, and the closure of relay CR initiates slightly later the control function of the regulating generator. Thereafter, the system continues operating until the stop contact 39 is opened so that contact CM and relay CR drop off into the illustrated open positions.

It is usually required that the torque of drum 6 and hence the armature load of motor M2 be larger than the torque and load of drum 5 and motor M1 respectively. As mentioned, such a difference in torque and load can be adjusted by means of the rheostat 26 in the circuit of the pattern field winding 23. Assuming that at the starting moment of the two motors M1 and M2, both motors are taking the same current load, the resistance drops across resistors 28 and 29 respectively, would at first be equal so that no excitation is imposed on the pilot field winding 25. Thence, the pattern field winding 23 would then be effective at its full strength as adjusted by rheostat 26. This pattern field acts to raise the voltage generated by armature 22 of the regulating generator. This voltage acts in addition to the voltage supplied by the main generator and hence causes the armature 10 of motor M2 to take up more current. As a result, the voltage drop across resistor 29 increases over that of resistor 28 so that the pilot field winding 25 receives excitation and reduces the resultant field in the regulating generator by acting differentially with respect to the pattern field. Therefore, the voltage raising effect of the pattern field continues only until the difference in the two voltage drops is such that the pilot field is in balance with the pattern field. From then on, no further action takes place and the generator RG continues to maintain its voltage at the value thus adjusted through action of the self-energizing field winding.

Assuming that during the operation of the system, the current in armature 10 of motor M2 rises beyond the desired limit relative to the current load of motor M1, the strength of the pilot field produced by winding 25 would exceed the pattern field strength. Hence now the field of winding 25 would predominate the differentially acting field of the winding 24 so that the voltage generated by armature 22 is correspondingly reduced. As a result, the current taken by armature 10 of motor M2 is likewise reduced until the pilot and pattern fields are again balanced.

If the system is so adjusted that motor M2 develops consideably more torque than motor M1, then the motor M1 will be required to act as a generator. Such a regenerative action will reverse the voltage drop in resistor 28 so that the excitation of the pilot field winding 25 is then determined by the algebraic sum of the voltage drops in resistors 28 and 29. Changes in tension, originating from the unwinding stand which accommodates the core 1 of the supply reel, do not affect the difference in torque or load between the two motors, but have merely the result of raising the torque level in both motors, while the regulating generator RG continues to regulate the differential load or torque so as to maintain it as a constant value. This independence of the control function from changes in tension is desirable for obtaining a properly wound roll of sheet material.

The embodiment of our invention illustrated in Fig. 2 is in various respects and details similar to the system described above with reference to Fig. 1. In order to facilitate comparing the two embodiments with each other and to permit brevity of description without loss in clarity, the last one or two digits of the numerals used in Fig. 2 are identical with the reference numerals of the respective elements in the system of Fig. 1 wherever structurally or functionally similar details are concerned.

The winder drive system according to Fig. 2 serves to actuate a supply reel core 101 and take-up core 104. As in the example of Fig. 1, the armatures 108 and 110 of motors M1 and M2 respectively are connected with resistors 128 and 129 in the load circuit of the main generator MG whose armature 113 is driven by a constant speed motor M3 together with the armature 116 of an exciter EG and the armature 122 of a regulating generator RG. The exciter energizes two mains X and Y. The field winding 111 of motor M1 receives excitation from mains X and Y through a rheostat 119, while field winding 112 of motor M2 is similarly excited through a rheostat 120. The mains X and Y supply also excitation for the pattern field winding 123 of generator RG through a rheostat 126. The pilot field winding 125 of generator RG is connected to resistors 128 and 129 so that the regulating generator is controlled in accordance with the example of Fig. 1 and operates substantially in the manner described in the foregoing. The excitation for the field winding 114 of the main generator MG is also derived from the mains X and Y, but in this embodiment two potentiometric rheostats 147 and 148 are used in order to permit reversing the direction of the voltage generated by the main generator MG for the purpose of temporarily reversing the winding direction of the material, for instance, during adjusting operations.

The system has further a contactor CM with four contacts 131, 132, 133 and 134. The circuit of coil 130 of contactor CM is controlled by a start contact 138, a stop contact 139 and an interlock contact 150, the latter being closed only when the rheostats 147 and 148 are set for zero or minimum field excitation of generator MG. A control relay CR is provided having a coil 135 and two contacts 137 and 136.

The self-excited field of the regulating generator RG is provided, in this embodiment, by a series-connected field winding 140 and a shunt field winding 124. The excitation of winding 124 can be calibrated by means of a rheostat 129 so that the total self-excitation is properly tuned to the no-load saturation characteristic of the machine.

The motors M1 and M2 in core type reel drives as represented by Fig. 2 are in many cases required to operate over a considerable range of speeds under shunt field control in order to compensate for the changes in reel diameter occurring during the unwinding and take-up performance of the two cores 101 and 104. In order to accomplish such at automatic change in speed in proper relation to the change in diameter of the respective reels, the rheostats 119 and 120 have their sliders automatically adjusted so that the resistance in the motor shunt field changes gradually as the reel diameter increases or decreases. To this end, the slider 141 of rheostat 119 is pivoted at 142 and controlled by a roller 143 which is biased toward the reel on core 101. Similarly, the slider 144 of rheostat 120 is pivoted at 145 and controlled by a roller 146 which is biased against the periphery of the reel on core 104. When the material 102 is taken off the core 101 and wound onto the core 104, the speed of motor M1 must increase as the diameter of the reel on core 101 decreases while the speed of motor M2 must simultaneously decrease in accordance with the growing reel diameter of the material accommodated on core 104. In accordance therewith, the effective resistance of rheostat 119 increases so that the shunt field of winding 111 is weakened, while the resistance of rheostat 120 decreases thereby strengthening the field of winding 112 in order to decrease the speed of motor M2.

The regulating generator of the system operates during this variable speed performance to maintain the driving torques of motors M1 and M2 in the desired relation to each other, substantially as explained in conjunction with the embodiment of Fig. 1. Consequently, the variation in the speed of the two driving motors does not interfere with the desired effect of maintaining the wound-up material under substantially constant tension, and does not interfere with the strip speed which is set by generator MG voltage adjustment.

It will be obvious to those skilled in the art upon studying the foregoing disclosure that motor control systems according to the invention may be modified in various respects, for instance as regards circuit arrangements and design and details of the individual machines and other elements of the system without departing from the principles and spirit of the invention and within the scope of its essential features, as set forth in the claims attached thereto.

We claim as our invention:

1. An electric motor control system, comprising two direct-current motors, a main generator connected to said two motors for energizing them simultaneously, a regulating generator of reversible voltage having an armature circuit connected with one of said motors for varying the amount of current flowing through said one motor said regulating generator having voltage-sustaining self-excited field means and having separately excited field means for controlling the magnitude and polarity of the reversible voltage, circuit means disposed for providing a normally constant voltage for said separately excited field means, and circuit means disposed for providing a variable voltage for said separately excited field means so that the resultant field of said latter field means depends on the differential value of said two voltages, said latter circuit means being connected to said two motors and responsive to the respective load currents thereof so that said variable voltage depends on the differential value of said currents, whereby said motors are caused to operate under maintenance of a load current difference depending upon the magnitude of said variable voltage.

2. An electric motor control system, comprising two direct-current motors, a main generator connected to said two motors for energizing them simultaneously, a regulating generator of reversible voltage having an armature circuit connected with one of said motors for varying the amount of current flowing through said one motor and being provided with sustaining self-excited field means and voltage separately excited field means for controlling the magnitude and polarity of the reversible voltage, circuit means disposed for providing a normally constant voltage for said separately excited field means and comprising an adjustable impedance member for selecting the value of said constant voltage, and circuit means disposed for providing a variable voltage for said separately excited field means so that the resultant field of said latter field means depends on the differential value of said two voltages, said latter circuit means being connected to said two motors and responsive to the respective load currents thereof so that said variable voltage depends on the differential value of said currents, whereby said motors are caused to operate under maintenance of a load current difference depending upon the adjustment of said impedance member.

3. An electric control system, comprising a main generator having an armature circuit with two parallel branches, two motors connected in said respective branches to be simultaneously energized by said main generator, a regulating generator of reversible voltage having an armature connected in series with one of said motors for varying the amount of current flowing through said one motor relative to the current of said other motor, said regulating generator having voltage-controlling separately excited field means with two mutually balanceable field control circuits for differentially controlling the magnitude and polarity of the reversible voltage, circuit means connected to one of said control circuits for providing therefor a normally constant voltage, two current-responsive voltage supply means connected with said respective branches to provide respective control voltages depending upon said respective currents, said other control circuit being connected to said two voltage supply means so as to be excited by the difference of said two control voltages.

4. An electric control system, comprising a main generator, two motors, a load circuit connected to said main generator and having two parallel branches containing said respective motors, two resistors connected with said respective branches to develop voltage drops in accordance with the currents flowing in said branches respectively, regulating apparatus having an output circuit of reversible voltage connected with one of said branches for varying the amount of current flowing in the corresponding motor, said regulating apparatus having control means for controlling the magnitude and polarity of the reversible voltage in response to the differential value of two control voltages, circuit means connected to said control means for providing one of said control voltage and comprising adjusting means for selecting a constant value for said one control voltage, and circuit means connected to said control means for providing said other control voltage, and being connected to said two resistors so that said other control voltage varies in accordance with the difference between said respective voltage drops, whereby said motors are caused to operate under maintenance of a load current difference depending upon the setting of said adjusting means.

5. An electric control system, comprising a main generator, two motors having normally constant fields respectively, a load circuit connected to said main generator and having two parallel branches containing said respective motors, two resistors series-connected with said respective motors in said respective branches in order to develop voltage drops in accordance with the currents flowing in said respective branches, a regulating generator of reversible output voltages having an armature series-connected in one of said branches to vary the current flowing in said one branch and being provided with two mutually differential and balanceable field windings for controlling the magnitude and polarity of said output voltage-circuit means connected with one of said windings for exciting it by normally constant voltages, said two resistors being series connected with said other field winding to excite said other winding in accordance with the difference between said respective voltage drops whereby said regulating generator is caused to maintain the current in said one branch at a given difference from that in said other branch depending upon the magnitude of said constant voltage.

6. An electric winder drive, comprising two revolvable devices for controlling a traveling sheet or strand material to be wound up under substantially constant winding tension, two separately field-excited direct-current motors having armatures in driving connection with said devices respectively, a load circuit having means for providing a direct current voltage of adjustable magnitude and having two parallel branches containing said armatures respectively, regulating apparatus having output terminals series connected in one of said branches for providing a reversible control voltage for the one appertaining armature in order to vary the current distribution between said two armatures, said regulating apparatus having control means responsive to the differential value of two control voltages for controlling the magnitude and polarity of said reversible voltage, circuit means connected to said control means for providing one of said control voltages and comprising adjusting means for selecting a constant value for said one control voltage, and circuit means connected to said control means for providing said other control voltage, said latter circuit means being connected to said two branches so that said other control voltage varies in dependence upon the difference of the currents flowing in said branches respectively, whereby said motors are caused to operate said respective devices under maintenance of a torque difference determined by the adjustment of said adjusting means.

7. An electric winder drive, comprising two revolvable devices for controlling a traveling sheet or strand material to be wound up under substantially constant winding tension, two separately field-excited direct-current motors having armatures in driving connection with said devices respectively, a load circuit having means for providing a direct-current voltage of adjustable magnitude and having two parallel branches containing said armatures respectively, two resistors series connected in said respective circuit branches so as to develop voltage drops indicative of the load currents flowing in said respective armatures, a regulating generator of reversible output voltage having an armature series-connected in one of said branches to vary the current flowing in said one branch and being provided with two mutually differential field windings for controlling the magnitude and polarity of said output voltage circuit means connected with one of said windings for exciting it by normally constant voltage, said other field winding being connected between said two resistors so as to be excited by the difference between said voltage drops, whereby said motors are caused to operate said respective devices under maintenance of a torque difference determined by the magnitude of said constant voltage.

8. An electric core-type winder drive, comprising two motors disposed for driving two respective reel cores and having each an armature and a separately excited field winding, means disposed for providing excitation for said field windings and comprising for each motor a rheostat and means for controlling said rheostat in dependence upon changes in diameter of the reels on said respective cores in order to vary the speed of said two motors in the mutual relation required for a given winding speed, a load circuit having means for providing a direct-current voltage of adjustable magnitude and having two parallel branches containing said armatures respectively, two resistors series connected in said respective circuit branches so as to develop voltage drops indicative of the load currents flowing in said respective armatures, a regulating generator having an armature series-connected in one of said branches to vary the current flowing in said one branch and being provided with two field windings of differential action relative to each other, circuit means connected with one of said windings for exciting it by normally constant voltage, said other field winding being connected between said two resistors so as to be excited by the difference between said voltage drops, whereby said motors are caused to operate said respective devices under maintenance of a torque difference determined by the magnitude of said constant voltage and substantially independent of the speed variation of said motors caused by said respective rheostats.

REST R. BAKER.
WALTER R. HARRIS.

REFERENCES CITED

The following references are of record in the file of this patent:

UNITED STATES PATENTS

| Number | Name | Date |
|---|---|---|
| 2,168,777 | McCreary | Aug. 8, 1939 |
| 2,281,063 | Cook | Apr. 28, 1942 |
| 2,333,978 | Bowman | Nov. 9, 1943 |